(12) United States Patent
Min et al.

(10) Patent No.: US 6,721,120 B2
(45) Date of Patent: Apr. 13, 2004

(54) PREDICTION AND CANCELLATION OF CAGE FREQUENCY IN A DISC DRIVE

(75) Inventors: Shuang Quan Min, Singapore (SG); Kian Keong Ooi, Singapore (SG); Ricky WeiWatt Yeo, Singapore (SG); Chiap Heok Ang, Singapore (SG); Ming Zhong Ding, Singapore (SG); Beng Wee Quak, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 524 days.

(21) Appl. No.: 09/844,159

(22) Filed: Apr. 27, 2001

(65) Prior Publication Data

US 2003/0206363 A1 Nov. 6, 2003

Related U.S. Application Data

(60) Provisional application No. 60/212,542, filed on Jun. 20, 2000.

(51) Int. Cl.[7] .......................... G11B 21/02; G11B 5/596
(52) U.S. Cl. ................... 360/75; 360/77.04; 360/77.03
(58) Field of Search .................. 360/75, 77.04, 360/77.03, 77.08, 78.09

(56) References Cited

U.S. PATENT DOCUMENTS

| 4,918,972 | A | 4/1990 | Kenny et al. |
|---|---|---|---|
| 5,162,955 | A | 11/1992 | Burdenko |
| 5,333,140 | A | 7/1994 | Moraru et al. |
| 5,339,204 | A | 8/1994 | James et al. |
| 5,341,255 | A | 8/1994 | Starr et al. |
| 5,581,420 | A | 12/1996 | Chainer et al. |
| 5,606,469 | A | 2/1997 | Kosugi et al. |
| 5,615,058 | A | 3/1997 | Chainer et al. |
| 5,774,295 | A | 6/1998 | Tsai |
| 5,835,300 | A | 11/1998 | Murphy et al. |
| 5,999,357 | A | 12/1999 | Serrano |
| 6,031,680 | A | 2/2000 | Chainer et al. |
| 6,476,995 | B1 * | 11/2002 | Liu et al. ............... 360/75 |
| 6,628,471 | B1 * | 9/2003 | Min et al. ............... 360/75 |

* cited by examiner

*Primary Examiner*—David Hudspeth
*Assistant Examiner*—K. Wong
(74) *Attorney, Agent, or Firm*—Mitchell K. McCarthy

(57) ABSTRACT

A method for writing servo information to a disc rotatably mounted to a spindle motor. A measured cage frequency is obtained from a written reference track, from which an actual cage frequency is predicted. The predicted cage frequency is then used to derive compensated position commands. During a servo write interval, the compensated position commands are used to control the head such that the head follows the disc movements caused by the cage frequency.

16 Claims, 4 Drawing Sheets

PREDICTION AND CANCELLATION OF CAGE FREQUENCY IN A DISC DRIVE

RELATED APPLICATIONS

The present application claims benefit of the U.S. provisional patent application No. 60/212,542, filed Jun. 20, 2000.

FIELD OF THE INVENTION

The present invention relates generally to disc drives. More particularly, the present invention relates to the writing of servo patterns in disc drives.

BACKGROUND OF THE INVENTION

Disc drives include one or more magnetizable discs mounted on a spindle motor for rotation. Information is stored on the discs in a plurality of nominally concentric tracks. Heads mounted to an actuator are used for writing information to the tracks and for reading back stored information. The actuator is moved by a voice coil motor to position the heads with respect to the tracks. Head positioning information, or servo information, is prerecorded on at least one of the discs during the manufacturing process, typically using a servowriter.

Such servowriter systems typically include a controller that sends position commands to a stationary head for writing servo information to a disc. The disc on which servo information is to be written is rotated by a spindle motor beneath the head so that the head defines a circular track on the disc. Ideally, the tracks defined by the servowriter should be perfectly concentric. Unfortunately, various factors such as bearing tolerances, misalignment of the discs, mechanical resonance of the servo writing system, and others, tend to lead to errors in the location of the servo information. One of the factors contributing to irregularities is the vibration of the spindle motor, known as spindle non-repeatable runout (NRRO), of which a most significant component is the cage frequency. The presence of a large cage frequency may cause the disc to be radially displaced with respect to the head, causing the head to write a spiral instead of a circle. This is referred to as a track closure problem. Track squeeze errors may also occur. This is when neighboring tracks are too close to each other. Track squeeze is undesirable because it may generate data crosstalk between neighboring tracks or result in distorted servo information.

In a high-density disc drive where the track width is very small, track closure and track squeeze errors can have a detrimental impact on the performance of the disc drive. Therefore, it is important to eliminate the effects of spindle NRRO.

One conventional method reduces the written in repeatable runout (RRO) by starting the servo track writing operation at a selected phase of the cage frequency. However, as the servowriter must wait for that selected phase of the cage frequency before writing the next track, the servo write process takes a long time. In addition, the problems of track closure and track squeeze as caused by the cage frequency are not sufficiently addressed.

Some conventional servowriters have resorted to the use of a dedicated position sensor to measure the relative movement between the head and the disc, and then to compensate for the relative movement. The use of a dedicated position sensor can be costly, and in view of the increasing demand for cheaper yet better quality disc drives, some cheaper solution is needed to solve the problem of having ill-defined tracks resulting from spindle NRRO.

The present invention provides a solution to this and other problems, and offers other advantages over the prior art.

SUMMARY OF THE INVENTION

The present invention compensates for the effect of cage frequency when writing servo information, thus providing a solution to track closure and track squeeze problems. In one embodiment, a servowriter system reads back servo information from a track during a "measurement interval." From the read back signals, a measured cage frequency value is extracted. As the head acts as a cage frequency sensor, in addition to writing servo information to the disc, the present invention is cheaper than conventional systems that require an additional laser position transducer dedicated to the measurement of cage frequency effects.

Based on the measured cage frequency, a predicted cage frequency is calculated. During a time period referred to as the servo write interval, the predicted cage frequency is fed, in a feed forward arrangement, to the servo commands controlling the position of the head. The head is thus made to follow the radial movement of the disc, and in this manner, cancel out the effects of the cage frequency. During the servo write interval, the servowriter system writes servo information to the disc.

At the end of the servo write interval, the process is repeated unless the last track for the disc has been written. The cage frequency compensation is switched off and the head reads back servo information from the last written track. This last written track is used as a reference track for the next measurement interval. As each subsequent predicted cage frequency should be more accurate than the previous predicted cage frequency, the servo write interval can be increased. Compared to the conventional method that requires synchronization with the cage frequency at every track, the present invention takes less time to complete the servo writing process as measurement of the cage frequency is only made intermittently.

These and various other features as well as advantages which characterize the present invention will be apparent upon reading of the following detailed description and review of the associated drawings.

DETAILED DESCRIPTION

Figure 1:
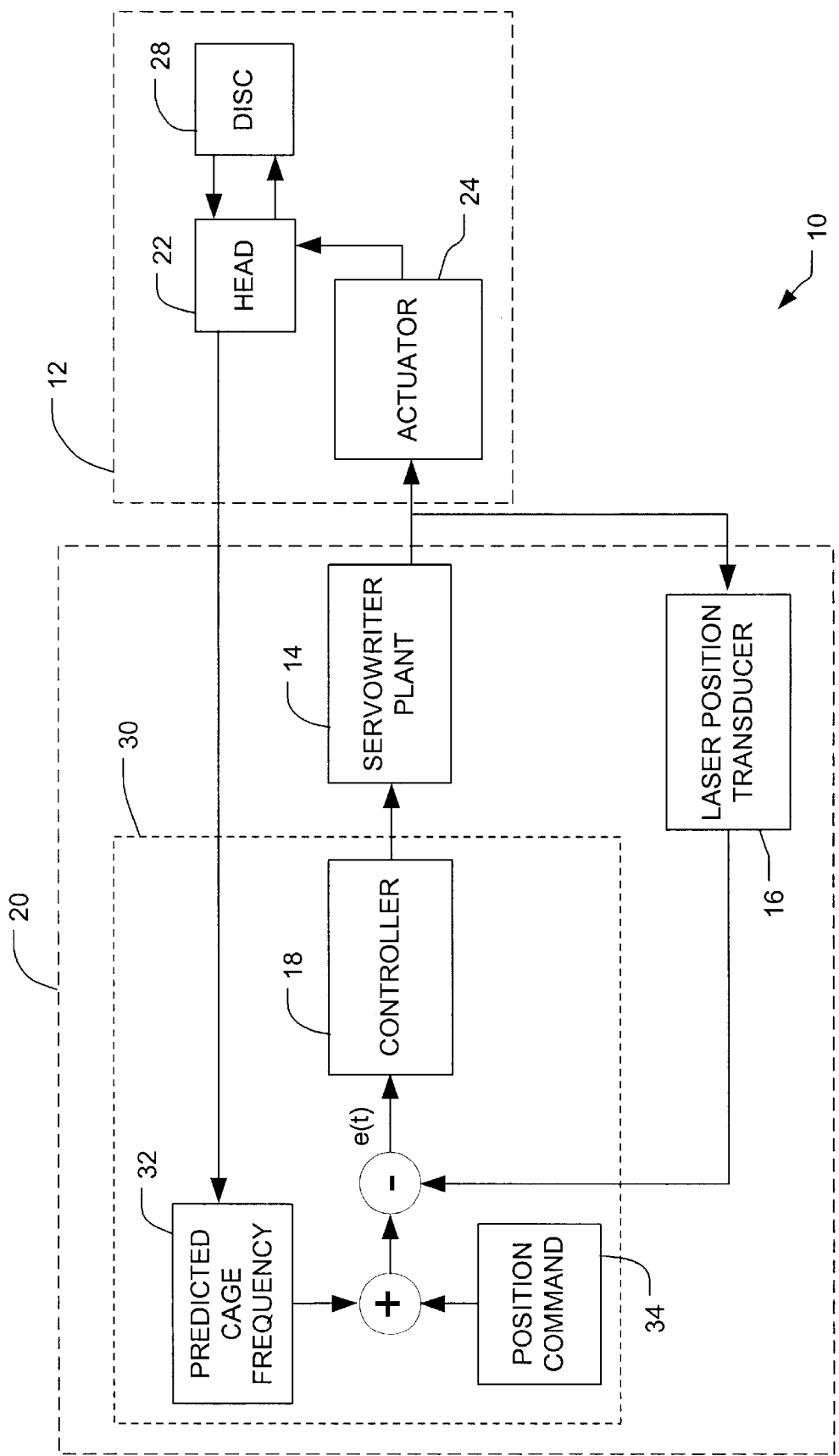
FIG. 1 is a block diagram of a servowriter system according to the present invention.

Turning now to the drawings, and more particularly to FIG. 1, there is shown a functional block representation of a servowriter system 10 for a disc drive 12. A servowriter 20 may include a servowriter plant 14 (for example, a push pin), a laser position transducer 16 and a controller 18. In the disc drive 12, a head 22 is supported on an actuator 24 that can control the position of the head 22 relative to a disc 28. The push pin of the servowriter moves the head according to the positon commands of the servowriter. The head is configured to write servo information to the disc, and to read back the servo information during servo writing process. During the servo writing process, any movement of the head relative to the servowriter system is detected indirectly by the laser position transducer 16 and compensated for accordingly. Such a laser position transducer is, however, unable to detect radial movement of the disc relative to the head resulting from cage frequency. Instead of using an additional laser position transducer to measure such radial movements caused by the cage frequency of the spindle motor, the present invention offers the advantage of using the head itself as a cage frequency sensor. Servo information read back by the head during a measurement interval is processed by an algorithm residing in a microprocessor 30 of the servowriter to extract a measured cage frequency. Based on the measured cage frequency, the servowriter system generates a predicted cage frequency 32. In the servo write interval, when the head is writing servo information to the disc, the predicted cage frequency is added to the position command 34 in a feed forward arrangement so as to make the actuator, and therefore the head, follow the disc movements due to the cage frequency. The result of this compensation is that there is no relative movement between the head and the disc that is contributed by the cage frequency. After the servo write interval, a second measurement of the cage frequency is taken, upon which a second predicted cage frequency is based. The cycle is repeated until the desired total number of tracks has been defined on the disc.

Figure 2:
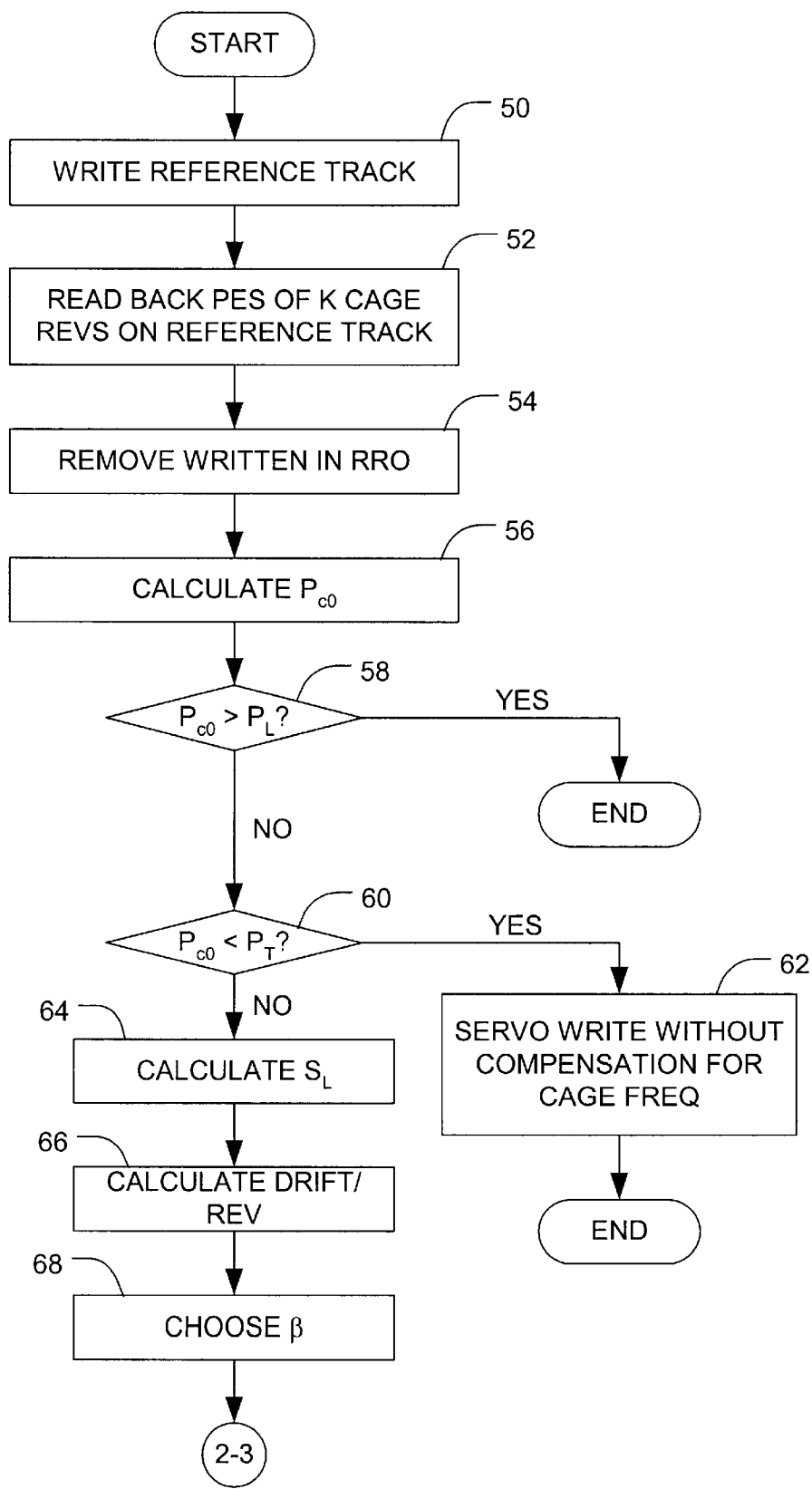
FIGS. 2, 3 and 4 show a flowchart detailing a preferred method of writing servo information to a disc drive.
Figure 3:
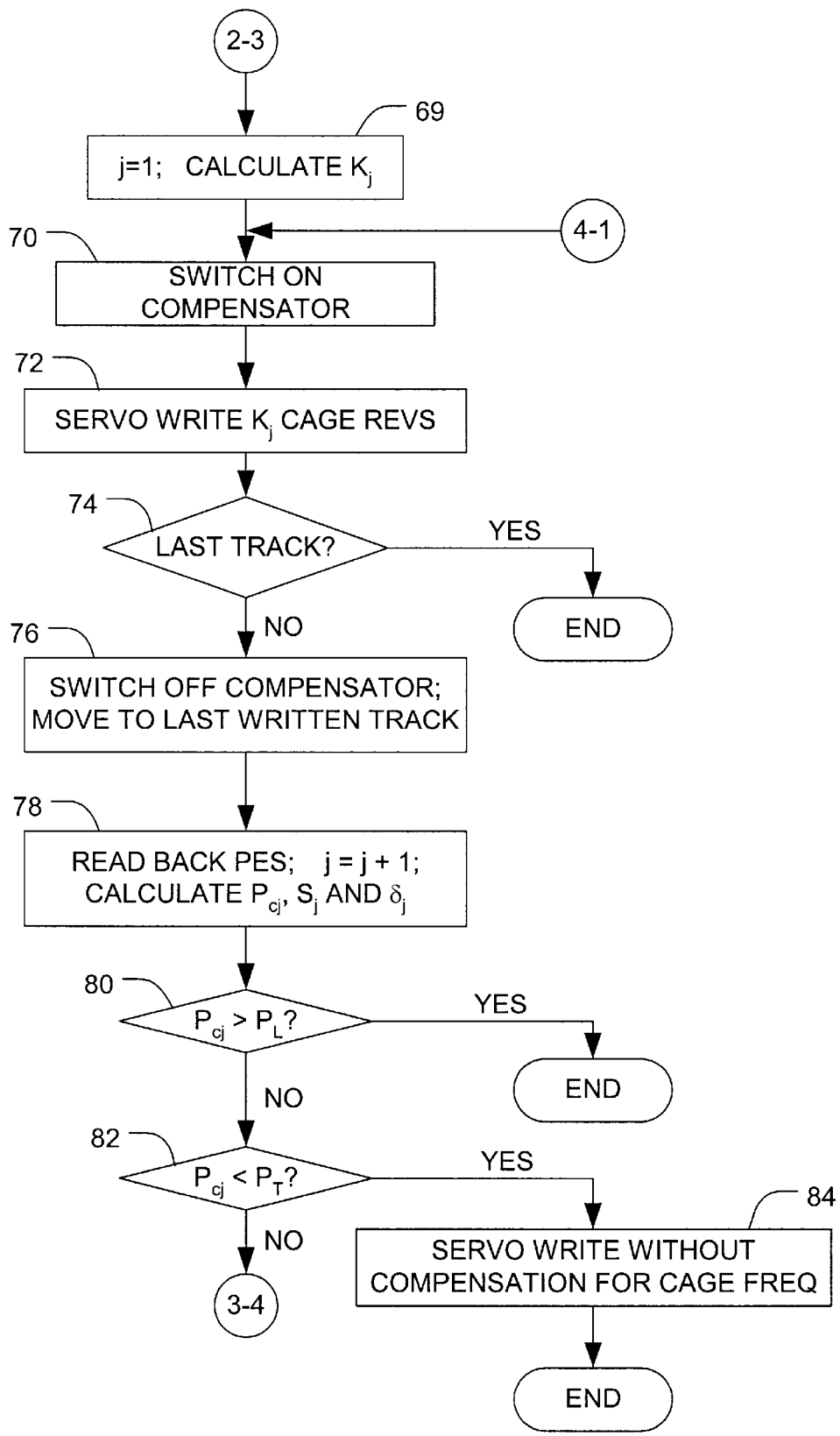
Figure 4:
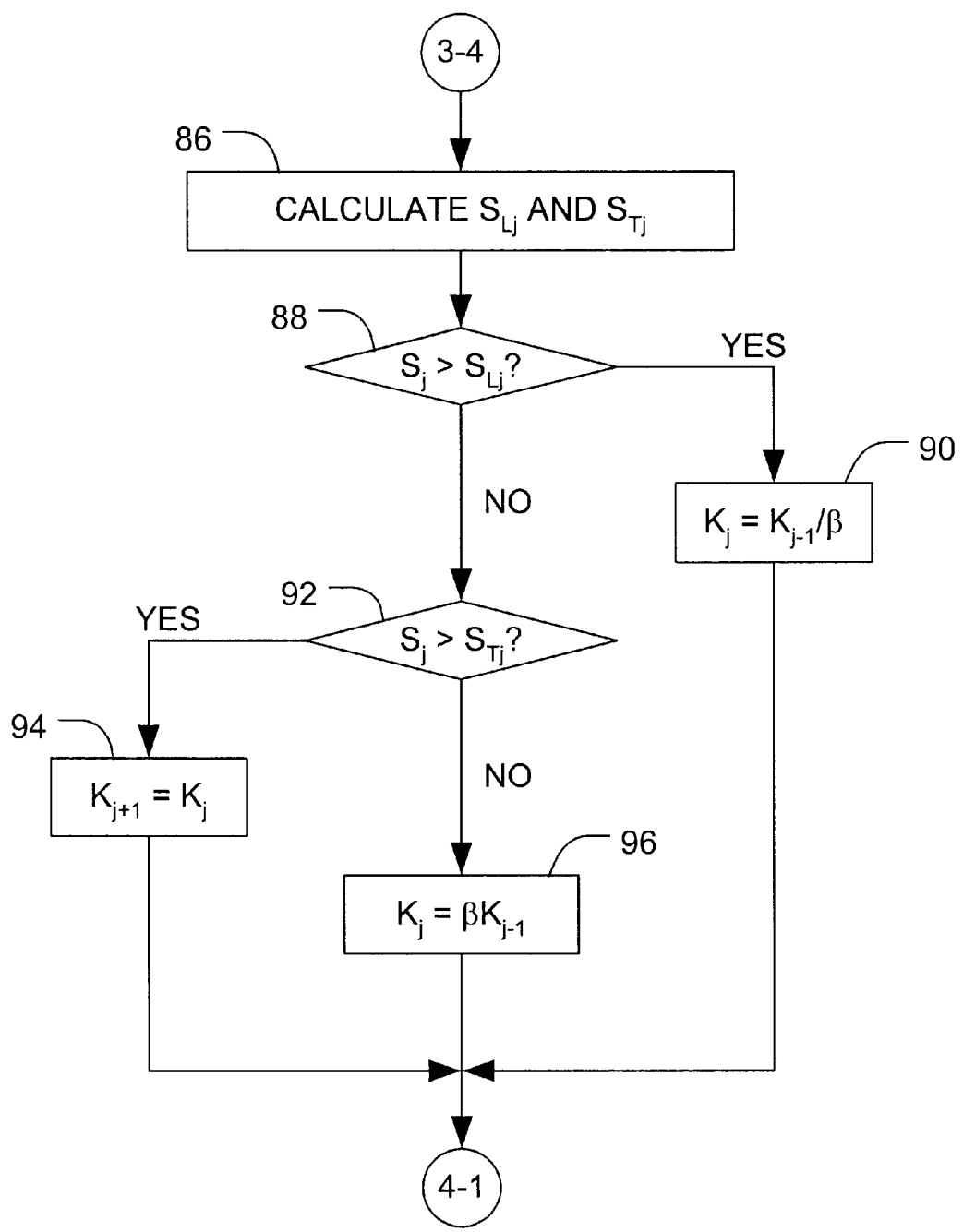

FIGS. 2, 3 and 4 provide a flowchart for illustrating a preferred method of predicting and canceling the cage frequency component from the servo information written to a disc. The servowriter first generates normal servo patterns and causes the head to write a reference track on the disc 50. The reference track may be written in a zone at the outer diameter or the inner diameter of the disc, in a region outside the user track zone. There may be written-in repeatable runout (RRO) on the reference track, and this may include the spindle RRO, cage frequency and track closure.

The head then reads back $M_0$ number of revolutions of the servo patterns of the reference track 52. From the position error signal (PES) read from the reference track, the servowriter system calculates the RRO using equation (1) given below:

$$R_0(n) = \sum_{m=1}^{M_0} \frac{P(n,m)}{M_0} \quad (1)$$

where P(n,m) is the PES of servo sectors n∈[0,N] in spindle revolution m. N is the number of servo sectors in a spindle revolution. If the PES measurement from the head is Pr(n) in a revolution, the actual non-repeatable runout (NRRO) is P(n)=Pr(n)−$R_0$(n). Removing the RRO component from the PES measured, the NRRO component, which includes the cage frequency, can be determined (step 54).

There are $$N_c = \frac{N \cdot f_m}{f_c}$$

servo sectors in a cage revolution, where N is the number of servo sectors in one spindle motor revolution, $f_m$ and $f_c$ are the spindle motor frequency and the initial cage frequency, respectively.

The magnitude $P_{c0}$ of the cage frequency component is obtained 56 from averaging each cage revolution as shown in equation (2) below:

$$P_c(n_c,k) = \alpha \cdot P(n_c,k) + (1-\alpha) \cdot P_c(n_c,k-1) \quad (2)$$

where $n_c \in [0,N_c]$ is the sector number of a cage frequency and k is the revolution number of cage frequency. α is a weight coefficient greater than 0 and less than 1. $P_c(n_c,k)$ is the magnitude of cage frequency at sector $n_c$ in cage frequency revolution k.

Alternatively, the cage frequency can be extracted by passing the NRRO P(n) through a bandpass filter having a center frequency of $f_c$.

It is found that the magnitude of the cage frequency is larger at the outer diameter than at the inner diameter of a disc, and that the top disc in a disc stack has a larger cage frequency than the bottom disc at the same zone. Therefore, in a disc drive with more than one disc, an average value for the magnitude of the cage frequency is used as the input of the feed forward compensation.

The peak magnitude $P_{c0}$ of the measured cage frequency is compared against a magnitude limit $P_L$ 58, which may be set with reference to the track width. If it is observed that a peak magnitude that is larger than 30 to 50 percent of the track width is suggestive of some fatal defects in the spindle motor, a suitable magnitude limit $P_L$ can be set at about 30 percent of the track width. For cases where the peak magnitude is larger than the magnitude limit, the servo write is terminated and the disc drive rejected.

The peak magnitude $P_{c0}$ is also compared against a threshold magnitude $P_T$ 60, which may be set with reference to the track width. If a peak magnitude of less than 5 to 6 percent of the track width is acceptable, the threshold magnitude may be set at about 5 to 6 percent of the track width. For cases where the peak magnitude is less than the threshold magnitude, the servo write process is carried out without compensation for cage frequency to reduce the time taken for the servo write process 62.

Experiments show that the magnitude of the cage frequency is very stable for a certain time interval in a disc drive. In comparison, the frequency of the cage frequency varies slightly from drive to drive, and from cage frequency revolution to cage frequency revolution. The phase drift is linear to the number of revolutions, and after a certain number of cage frequency revolutions, a significant phase drift will be apparent. During servo write, the servowriter has no information on the phase drift.

In the present invention, the predicted cage frequency is represented by $P_i(n_c) = P_c \cdot \sin(2\pi f_c T_s \cdot (n_c+l))$, and that the actual cage frequency is $P_c(n_c) = P_c \cdot \sin(2\pi f_c T_s \cdot n_c)$, where $$T_s = \frac{1}{Nf_m}$$

is the sampling duration of the servo system and l is the number of phase drift sectors. Assuming that the magnitudes of the predicted cage frequency and of the actual cage frequency are the same, the error between the actual cage frequency and the predicted cage frequency due to phase drift, otherwise known as the feed forward compensation error, is $$E(n_c) = P_c(n_c) - P_i(n_c) = \quad (3)$$
$$\frac{\sin(2\pi f_c T_s \cdot l)}{\sin\left(\pi f_c T_s \cdot \left(\frac{1}{2}N_c - l\right)\right)} \cdot P_c \cdot \sin\left(2\pi f_c T_s \cdot \left(n_c - \frac{1}{2}\left(\frac{1}{2}N_c - l\right)\right)\right)$$

If there is no phase drift, that is, if l=0, the feed forward compensation error $E(n_c)=0$. However, when the phase drift $$l = \frac{N_c}{2},$$

the feed forward compensation error $E(n_c) = 2 \cdot P_c \cdot \sin(2\pi f_c T_s \cdot n_c)$ results in aggravated track closure and track squeeze errors.

Thus, if $P_T < P_c < P_L$, the next step 64 is to calculate the phase drift limit $(-S_L, S_L)$ using the following equation:

$$E_T = \frac{\sin(2\pi f_c T_s \cdot S_L)}{\sin\left(\pi f_c T_s \cdot \left(\frac{1}{2}N_c - S_L\right)\right)} \cdot P_c \quad (4)$$

where $E_T$ is a predefined track closure and track squeeze error threshold. The relationship between $P_c$ and $S_L$ can be stored in a table in the servo writer memory and the phase drift limit $S_L$ can be obtained by looking up the table.

The phase drift per revolution $\delta_0$ is next determined 66. Assuming that the head reads back $$K = \frac{N \cdot M_o}{N_c}$$

revolutions of cage frequency from the reference track, and the phase drift between the first revolution and the last revolution is $S_0$. The phase drift per revolution is $$\delta_0 = \frac{S_0}{K}.$$

The accuracy of the calculated phase drift per revolution is $$\frac{err}{K}$$

sectors where err is the accuracy of the phase drift sector calculation (3 sigma).

$$err = 3\sigma = 3\sqrt{\frac{1}{K}\sum_{k=1}^{K}(N_{ck} - \overline{N}_c)^2},$$

where $N_{ck}$ is the calculated number of sectors in revolution k and $$\overline{N}_c = \frac{1}{K}\sum_{k=1}^{K} N_{ck}$$

is the mean number of sectors per revolution. err is determined by the cage frequency signal to noise ratio. The accuracy improves as K increases. The measured cage frequency can thus be more accurately represented by $$f_{c0} = \frac{f_c \cdot N_c}{N_c + \delta_0}$$

than the initial cage frequency $f_c$.

It can therefore be predicted that after the servowriter writes k cage revolutions of the servo pattern with cage frequency compensation, the phase drift due to the inaccuracy of the calculated phase drift is within $$\frac{k \cdot err}{K}.$$

For simplicity, here the number of the cage revolution is used to calculate the servo write time instead of spindle revolutions. If the first interval of servo write is $K_1 = \beta \cdot K$ cage revolutions, where $\beta$ is an expansion coefficient, the phase drift between the predicted and actual cage frequency is within $\beta \cdot err$ after $K_1$ revolutions of servo write. If the phase drift limitation is $S_L$, $\beta$ is chosen so that $$\beta \leq \frac{S_L}{err} 68.$$

The cage frequency compensator is provoked (step 70) for the servo write interval set 69. Using a sine waveform table stored in the servowriter memory, the predicted cage frequency is generated and provided to the servo write system in a feed forward arrangement. The servowriter writes servo patterns in a first servo write interval of $K_1$ cage revolutions 72.

The predicted cage frequency can be expressed as $P_t(n_c) = \sin(2\pi f_c T_s \cdot n_c)$, where $n_c \in [0, N_c]$. Since the phase drift is linear to the number of cage frequency revolutions, the predicted cage frequency that is fed to the compensator is modified to $P_t(n_c, k) = \sin(2\pi f_c T_s \cdot (n_c + \text{int}(k\delta_0)))$, where int $(k\delta_0)$ is the integer part of $k\delta_0$. For simplicity of description, the peak magnitude of the cage frequency $P_c$ is omitted from the expression.

After $K_1$ cage revolutions of servo write, the servowriter repeats the process of measuring and predicting the cage frequency and of writing servo information to new tracks with cage frequency compensation. This is repeated until the last track of the disc has been written 74. If more servo tracks are to be written, the servowriter moves the head back to the last written track 76 and, without cage frequency compensation, the head measures the PES of $M_1$ spindle revolutions on the last written track 78. $M_1$ may be set much smaller than $M_0$ because the value of $M_1$ has no impact on the phase drift calculation accuracy, but $M_1$ must be set larger than the transient of the bandpass filter of the cage frequency. The peak magnitude, phase drift and phase drift per revolution of the cage magnitude are obtained as described above. The peak magnitude is again compared with the magnitude limit $P_L$ 80 and the threshold magnitude $P_T$ 82. If $P_{cj} > P_L$, the servo write process is terminated and the disc drive is rejected. If $P_{cj} < P_T$, compensation for cage frequency is deemed unnecessary, and the servo write proceeds without compensation for cage frequency 84. If $P_T < P_{cj} < P_L$, a phase drift limitation $S_{Lj}$ is calculated, either by using equation (4) or by looking up a table. A phase drift threshold $S_{Tj}$ is chosen 86 so that $S_{Tj} = \gamma \cdot S_{Lj}$, where $\gamma$ is a constant and $$\frac{1}{\beta} \leq \gamma \leq 1.$$

The magnitude of expected feed forward input is updated with the measurement for next servo write interval. Meanwhile, assuming that the difference between the predicted phase drift and the phase drift calculated from the measurement of the last written track is $S_1$, the phase drift in each revolution due to the inaccuracy of $f_{c0}$ is $$\delta_1 = \frac{S_1}{K_1}.$$

The accuracy of the calculated phase drift per revolution is $$\frac{err}{K_1}$$

sectors. The accuracy is improved because $K_1 > K$. The more accurate cage frequency is obtained, i.e.

$$f_{c1} = \frac{f_c \cdot N_c}{N_c + \delta_0 + \delta_1}.$$

The phase drift can be cancelled during the second servo write interval using $P_t(n_c,k)=\sin(2\pi f_c T_s \cdot (n_c+int(k(\delta_0+\delta_1))))$. The second interval of servo write can be larger than the first interval because the more accurate cage frequency has been calculated. If the second interval of servo write is $K_1=\beta \cdot K$ cage revolutions, the maximum phase drift is still within $\beta \cdot$err. By iteration, if the interval j of servo write is $$K_j=\beta \cdot K_{j-1}=\beta^j \cdot K \text{ cage revolutions} \quad (5)$$

With the maximum phase drift still within $\beta \cdot$err, $$P_i(n_c, k) = \sin(2\pi f_c T_s \cdot (n_c + int(k \cdot \sum_{i=0}^{j} \delta_i)))$$

and the calculated cage frequency $$f_{cj} = \frac{f_c \cdot N_c}{N_c + \sum_{i=0}^{j} \delta i}.$$

Here $\delta i$ is the phase drift per revolution measured at interval i.

As the frequency of the spindle cage frequency may vary slightly, provision is made for the servo write interval to be adjusted. If the predicted phase drift is greater than the phase drift calculated from the measurement 88, that is, $S_j>S_{Lj}$, the next servo write interval should be shorter than the previous interval 90, that is, $$K_{j+1} = \frac{K_j}{\beta} = K_{j-1}.$$

If $S_{Tj}<S_j<S_{Lj}$, the next servo write interval is set to be equal to the previous interval 92, 94, that is, $K_{j+1}=K_j$. If $S_j \leq S_{Tj}$, the next servo write interval is expanded to $K_{j+1}=\beta \cdot K_j$ 96.

With such an adaptive adjustment of servo write interval, the servo write process time is minimized and the compensation error is limited within the track splice and track squeeze error threshold $E_T$.

Alternatively, embodiments of the present invention may be described as follows:

The present invention provides for a servowriter system 10 having a head 22 controllable by position commands 34 for writing servo information to a disc 28 and for a method for writing servo information to the disc. The method includes steps of: (a) obtaining a measured cage frequency from a reference track 56; (b) predicting a cage frequency based on the measured cage frequency 70; (c) adding the cage frequency obtained in step (b) to the position commands to obtain compensated position commands 70; and (d) during a servo write interval, writing servo information to the disc using the compensated position commands 72.

The obtaining step (a) preferably includes steps of: (e) writing servo information for the reference track on the disc 50; (f) reading back servo information from the reference track during a measurement interval 52; and (g) removing a repeatable runout component from the servo information read back in step (f) to obtain the measured cage frequency 54. According to one preferred embodiment, steps (a) to (d) are repeated 78, and the measurement interval is set shorter when repeating step (f).

In an alternative embodiment, the obtaining step (a) includes steps of: (e) writing servo information for the reference track on the disc 50; (f) reading back servo information from the reference track for a measurement interval 52; and (g) passing the servo information read back in step (f) through a band pass filter having a center frequency equal to an initial measured cage frequency that had been obtained earlier 54. According to a preferred embodiment, steps (a) to (d) are repeated 78, and the measurement interval is set shorter when repeating step (f) but longer than the band pass filter of step (g).

In yet another embodiment, the obtaining step (a) includes steps of: (e) writing servo information for the reference track on the disc 50; (f) reading back servo information from the reference track for each cage revolution in a measurement interval 52; and (g) calculating a weighted average of the servo information obtained in step (f) to obtain the measured cage frequency 54.

In one aspect of the invention, the obtaining step (a) includes using a first written track as the reference track. In another aspect of the invention, the obtaining step (a) includes using a last written track written as the reference track 76.

The predicting step (b) may include retrieving a sine waveform from a memory device and using the sine waveform to generate the predicted cage frequency 70.

The method may further include steps of: (h) defining a phase drift threshold 78, 86; and (i) obtaining a phase drift limit based on the measured cage frequency and the phase drift threshold 64, 86. It may involve steps of: (j) calculating an estimated phase drift per revolution of the cage frequency from the measured cage frequency 66; (k) calculating the accuracy of the estimated phase drift per revolution; and (l) choosing an expansion coefficient that is equal to or less than the phase drift limit divided by the accuracy of the estimated phase drift per revolution 68.

Preferably, the method includes steps of: (m) setting a new servo write interval for a repeated writing step (d); and (n) repeating steps (a) to (d) using the new servo write interval in the repeated step (d). This may involve (o) calculating a measured phase drift from the servo information read back in a previous step (f); (p) if the measured phase drift is greater than the phase drift limit, setting the new servo write interval to be shorter than the previous servo write interval 90; (q) if the measured phase drift is not greater than the phase drift limit and not greater than the phase drift threshold, setting the new servo write interval to be longer than the previous servo write interval 96; and (r) if the measured phase drift is greater than the phase drift threshold, setting the new servo write interval to be same as the previous servo write interval 94. In one embodiment, the new servo write interval is $1/\beta$ of the previous servo write interval 90, where $\beta$ is the expansion coefficient obtained in step (l). In another, the new servo write interval is $\beta$ times as long as the previous servo write interval 96.

The method preferably further involves steps of: (h) defining a track closure and track squeeze error threshold 78, 86; and (i) obtaining a phase drift limit based on the measured cage frequency and the track closure and track squeeze error threshold 64, 86. The method may involve steps of (j) calculating an estimated phase drift per revolution of the cage frequency from the measured cage frequency 66; (k) calculating the accuracy of the estimated phase drift per revolution; and (l) choosing an expansion coefficient that is equal to or less than the phase drift limit divided by the accuracy of the estimated phase drift per revolution 68. Preferably, in repeating steps (a) to (d) 78, the servo write interval in the repeated step (d) is set to be $\beta$ times as long as the servo write interval in the first step (d) performed, where $\beta$ is the expansion coefficient obtained in step (l).

In another aspect, the method may further include steps of: (m) calculating a measured phase drift of the cage frequency based on the servo information read back in step (f); (n) if the measured phase drift is greater than the phase drift limit, writing servo information for a shorter servo write interval when the writing step (d) is repeated 90; (o) if the measured phase drift is less than the phase drift limit, writing servo information for a longer servo write interval when the writing step (d) is repeated 96.

It is to be understood that even though numerous characteristics and advantages of various embodiments of the present invention have been set forth in the foregoing description, together with details of the structure and function of various embodiments of the invention, this disclosure is illustrative only, and changes may be made in detail while maintaining substantially the same functionality without departing from the scope and spirit of the present invention.

What is claimed is:

1. A method for writing servo information to a disc rotatably mounted to a spindle motor, the method comprising steps of:
   (a) obtaining a measured cage frequency from a reference track;
   (b) predicting a cage frequency based on the measured cage frequency;
   (c) deriving compensated position commands based on the predicted cage frequency obtained in step (b); and
   (d) during a servo write interval, writing servo information to the disc using the compensated position commands.

2. A method of claim 1 wherein the obtaining step (a) comprises steps of:
   (e) writing servo information for the reference track on the disc;
   (f) reading back servo information from the reference track during a measurement interval; and
   (g) removing a repeatable runout component from the servo information read back in step (f) to obtain the measured cage frequency.

3. A method of claim 2 further comprising repeating steps (a) to (d), wherein the measurement interval in the repeated step (f) is shorter than the measurement interval in the first step (f) performed.

4. A method of claim 1 wherein the obtaining step (a) comprises steps of:
   (e) writing servo information for the reference track on the disc;
   (f) reading back servo information from the reference track for a measurement interval; and
   (g) passing the servo information read back in step (f) through a band pass filter having a center frequency equal to an initial measured cage frequency that had been obtained earlier.

5. A method of claim 4 further comprising repeating steps (a) to (d), wherein the measurement interval in the repeated step (f) is shorter than the measurement interval in the first step (f) performed and longer than the transient period of the band pass filter of step (g).

6. A method of claim 1 wherein the obtaining step (a) comprises steps of:
   (e) writing servo information for the reference track on the disc;
   (f) reading back servo information from the reference track for each cage revolution in a measurement interval; and
   (g) calculating a weighted average of the servo information obtained in step (f) to obtain the measured cage frequency.

7. A method of claim 1 wherein the obtaining step (a) includes using a first written track as the reference track.

8. A method of claim 1 wherein the obtaining step (a) includes using a last written track as the reference track.

9. A method of claim 1 wherein the predicting step (b) includes retrieving a sine waveform from a memory device and using the sine waveform to generate the cage frequency.

10. A method of claim 1 further comprising steps of:
    (h) defining a phase drift threshold; and
    (i) obtaining a phase drift limit based on the measured cage frequency and the phase drift threshold.

11. A method of claim 10 further comprising steps of:
    (j) calculating an estimated phase drift per revolution of the cage frequency from the measured cage frequency;
    (k) calculating the accuracy of the estimated phase drift per revolution; and
    (l) choosing an expansion coefficient that is equal to or less than the phase drift limit divided by the accuracy of the estimated phase drift per revolution.

12. A method of claim 11 further comprising steps of:
    (m) setting a new servo write interval for a repeated writing step (d); and
    (n) repeating steps (a) to (d) using the new servo write interval in the repeated step (d).

13. A method of claim 12 wherein the setting step (m) further comprises steps of:
    (o) calculating a measured phase drift from the servo information read back in a previous step (f);
    (p) if the measured phase drift is greater than the phase drift limit, setting the new servo write interval to be shorter than the previous servo write interval;
    (q) if the measured phase drift is not greater than the phase drift limit and not greater than the phase drift threshold, setting the new servo write interval to be longer than the previous servo write interval; and
    (r) if the measured phase drift is greater than the phase drift threshold, setting the new servo write interval to be same as the previous servo write interval.

14. A method of claim 13 wherein the step (p) includes setting the new servo write interval to be $1/\beta$ of the previous servo write interval, and wherein $\beta$ is the expansion coefficient obtained in step (l).

15. A method of claim 13 wherein the step (q) includes setting the new servo write interval to be $\beta$ times as long as the previous servo write interval, and wherein $\beta$ is the expansion coefficient obtained in step (l).

16. An apparatus comprising:
    at least one disc mounted for rotational motion;
    at least one head, each head being configured to write to and read from a disc;
    means for predicting and canceling cage frequency as the head writes servo patterns to the disc.

* * * * *